United States Patent
Sprigg et al.

(10) Patent No.: US 6,725,069 B2
(45) Date of Patent: *Apr. 20, 2004

(54) WIRELESS TELEPHONE AIRPLANE AND ALARM CLOCK MODES

(75) Inventors: Stephen A. Sprigg, Poway, CA (US); James A. Hutchison, IV, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/267,517

(22) Filed: Oct. 8, 2002

(65) Prior Publication Data

US 2003/0032464 A1 Feb. 13, 2003

Related U.S. Application Data

(63) Continuation of application No. 09/504,243, filed on Feb. 15, 2000, now Pat. No. 6,453,182.

(51) Int. Cl.[7] .................................................. H04B 1/38
(52) U.S. Cl. ...................................... 455/574; 455/343.1
(58) Field of Search ........................... 455/343.1, 343.4, 455/572, 574, 575; 370/311

(56) References Cited

U.S. PATENT DOCUMENTS 4,860,005 A * 8/1989 DeLuca et al. ........... 455/343.1
5,625,882 A * 4/1997 Vook et al. ............... 455/343.4
6,029,061 A * 2/2000 Kohlschmidt ............... 455/574
6,088,602 A * 7/2000 Banister ..................... 455/574

FOREIGN PATENT DOCUMENTS

FR   0939495 A1 * 9/1999 ............ H04B/1/00
GB   2136616 A  * 9/1984 ............ H04B/1/06

* cited by examiner

Primary Examiner—Quochien B. Vuong
(74) Attorney, Agent, or Firm—Philip R. Wadsworth; Charles D. Brown; Howard H. Seo

(57) ABSTRACT

A wireless telephone (200) has a power supply (102), which supplies power to a counter (104), a processor (106), a wireless modem (108), and a transceiver (110). The transceiver (110) communicates with the outside world through an antenna (112). The processor exchanges signals with a clock-calendar (114). When the telephone is in power-conservation mode, the processor opens a switch (216) between the power supply and the transceiver and modem. A second switch (218) is interposed between the power supply (102) and the processor (106), and is under the control of the counter (204). Thus, in power-conservation mode, only the counter draws power. Power-conservation mode (302) may be exited by external command (304), a signal from the clock-calendar (306), or an attempt to place an outgoing call (308).

8 Claims, 2 Drawing Sheets

WIRELESS TELEPHONE AIRPLANE AND ALARM CLOCK MODES

RELATED APPLICATIONS

This application is a continuation of application Ser. No. 09/504,243 filed Feb. 15, 2000 U.S. Pat. No. 6,453,182.

BACKGROUND OF THE INVENTION

1. Technical Field

This invention relates to wireless telephones, and has particular relation to reduced power modes, such as when the telephone is in an RF-transmission-restricted environment, such as an airplane, or is being used in a mode of reduced activity, such as operating as an alarm clock.

2. Background Art

A wireless telephone (cellular, PCS, etc.) is sometimes in a situation (such as on an airplane) where transmission is prohibited. The conventional method for dealing with such situations is to disable the transceiver, either by hardware or software. The transmitter and receiver consume much of the power required by the telephone, so this method has the additional benefit of conserving the battery.

Similarly, the telephone may be used as an alarm clock. Since the user does not wish to receive calls while he is asleep, the transceiver is turned off, and the alarm clock feature continues. The alarm clock feature is distinct from the reminder feature, in which the telephone is configured to remind the user, during the day, of an upcoming appointment, and also is configured to receive and place calls as required. Turning off the transceiver provides a significant power reduction in alarm clock mode in comparison to remind mode. Later the alarm clock can turn the transceiver back on.

SUMMARY OF THE INVENTION

Applicants have noted that, while transmission and reception consume much of the power required by the telephone, there is a substantial power drain even when the transceiver is disabled. In particular, the wireless modem remains enabled even during airplane and alarm clock modes, when the transceiver itself is disabled. The present invention thus provides that both the transceiver and the modem be disabled, yet also provides that substantial other (and low power) apparatus be enabled during the airplane and alarm clock modes. For example, the user would continue to have access to the phone book, messages, and other phone features. Moreover, the alarm feature continues to function, as do alerts from calendar applets. This last feature is particularly important when the telephone is coupled with a personal digital assistant (PDA). If the telephone is not coupled with a PDA, then it is the modem function, rather than a separate modem per se, which is enabled or disabled. Such coupling is preferred, but not required, in the present invention.

Applicants accomplish this by having a low current counter (hardware) wake up the rest of the processor every 2.5 minutes. This 2.5 minute time period is adjustable. Usually the only thing the processor does is update the clock/calendar and go back to sleep. However, it can be set to automatically turn the phone on at a particular time, or to wait until manually commanded to turn the phone on.

The former choice is suited to an alarm clock mode. While the user is asleep at night, he does not want the telephone to receive calls, and therefore manually sets the telephone to alarm clock mode, so that he can continue to sleep. Alternatively, the user may select auto-entry, so that the alarm clock mode is automatically entered at a fixed time every evening. At some pre-determined time the next morning, the phone (modem and transceiver) turns on and allows incoming calls. This turn-on may be accompanied by an audible alarm, or may be silent. The phone exits alarm clock mode when the user commands an exit, at the alarm time, or when the user places an outgoing call, whichever happens first.

The latter choice is suited to the airplane mode. Even if the airplane is scheduled to land at 4:00 P. M., it is unwise to have the phone automatically turn itself on at that time. Planes often are late. It is far better for the user to wait until he is off the plane and in the terminal, and then manually turn the phone on. The phone exits airplane mode only when the user commands an exit. There is no fixed exit time, and the user is not permitted to place an outgoing call when the phone is in airplane mode.

In either mode, the phone book, calendar applets, etc. remain enabled.

DETAILED DESCRIPTION OF THE PREFERRED EMBODIMENTS

Figure 1:
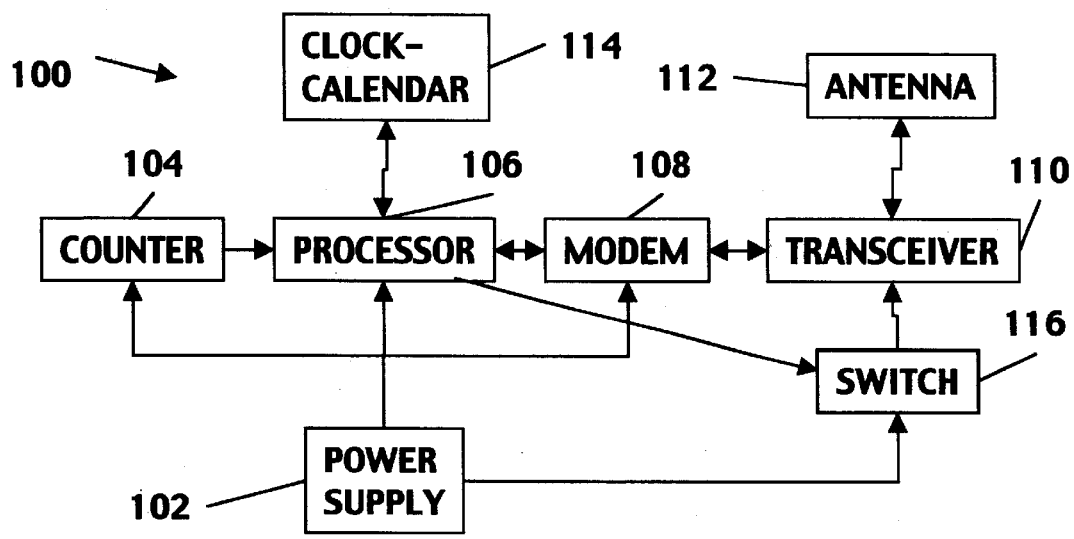
FIG. 1 is a block diagram of a prior-art wireless telephone.

FIG. 1 is a block diagram of a prior-art wireless telephone (100). A power supply (102) supplies power to a counter (104), a processor (106), a wireless modem (108), and a transceiver (110). The transceiver (110) communicates with the outside world through an antenna (112). The processor exchanges signals with a clock-calendar (114). When the telephone is in power-conservation mode, the processor opens a switch (116) between the power supply and the transceiver, thereby preventing the transceiver from consuming power. The switch may be implemented in hardware or software. Thus, one way to open a switch is to signal a power regulation circuit to remove power from the transceiver. The processor itself may go into power-conservation mode. In this mode, the counter (104) runs continuously. When it counts down to zero (typically every two and a half minutes, although other periods may be selected if desired), it so notifies the processor. The processor wakes up just enough to reset the clock-calendar (114), and then goes back to sleep. Even when asleep, the processor and modem draw some power, but the amount of power is small.

Figure 2:
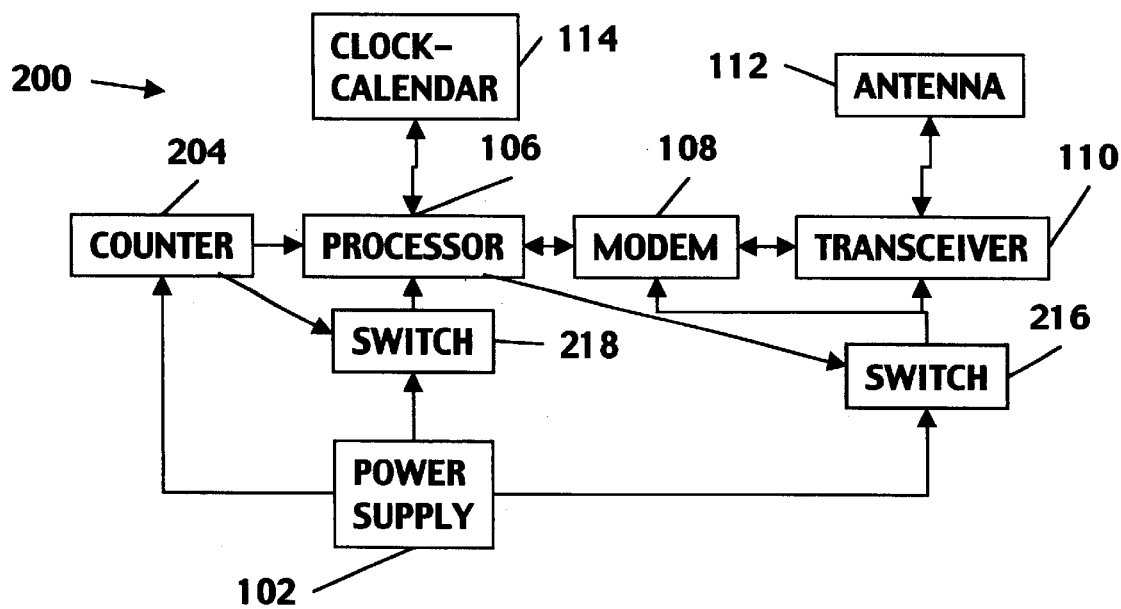
FIG. 2 is a block diagram of wireless telephone according to the present invention.

FIG. 2 is a block diagram of wireless telephone according to the present invention (200). The structure is similar to that of the prior-art telephone (100) shown in FIG. 1, with two important differences. First, the prior-art switch (116) has been modified to a novel switch (216) which controls power to the modem (108) as well as to the transceiver (110). Thus, when the processor commands a power-conservation mode, power is withdrawn from the modem and the transceiver, and not just to the transceiver. Second, a second switch (218) is interposed between the power supply (102) and the processor (106), and is under the control of the counter (204). Thus, in power-conservation mode, only the counter draws power. The processor draws power only intermittently, and both the modem and the transceiver draw power only when the switch (216) is commanded to close by the processor (106).

The phone can selectively power-down the transmitter and the receiver. The phone software can enable a counter which generates a signal when the counted time has passed. The phone software can cause the CPU to suspend operation, and optionally disable the CPU's clock source, until a signal arrives. The signal can come from the counter or from other devices such as a keypad.

Figure 3:
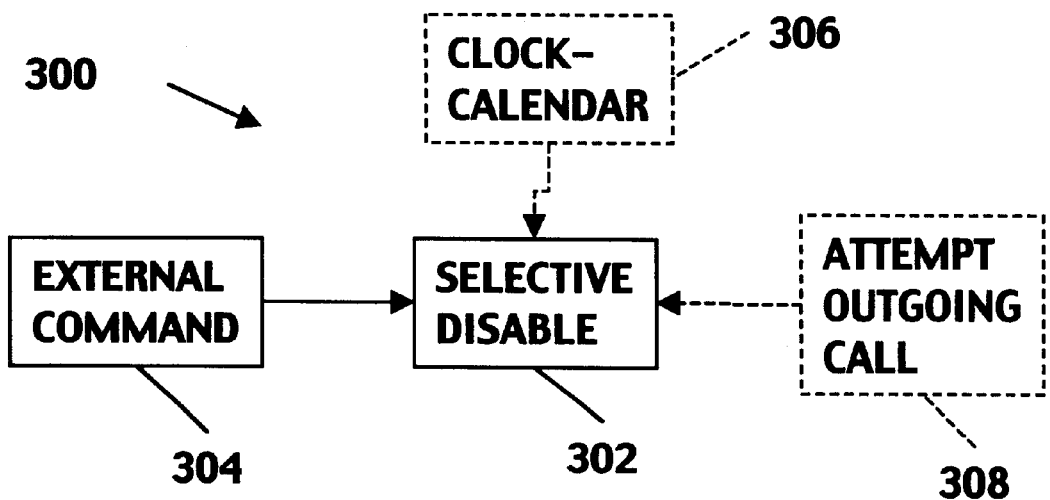
FIG. 3 is a flow chart of a novel method for operating a wireless telephone.

FIG. 3 is a flow chart of a novel method (300) for operating a wireless telephone. It shows that the command from the processor (106) to the switch (216), to selectively disable (302) the modem and transceiver, may come from any of three sources. The first is an external command (304). When the user gets off the airplane, or wakes up before the alarm clock goes off, he can manually leave the power conservation mode. The second is from the clock-calendar (306). If the processor determines from the clock-calendar that it is time to wake the user up, then presumably the user wants to be able to receiver telephone calls as well. The third is from the attempt (308) to make an outgoing call. If the user wakes up in the middle of the night and attempts to make an outgoing call, then presumably he wants the modem and transceiver to work; he should not be required to manually leave the power-conservation mode by means of an external command.

Selective disabling (302) of the modem (108) and transceiver (110) is mandatory if invoked by an external command (304). The user has to be able to turn off the modem and transceiver (while leaving the other functions in operation) when he walks onto an airplane, and he has to be able to turn them back on when he walks off the airplane. The other two invocations of selective disabling—by clock-calendar (306) or an attempted outgoing call (308)—are optional. The user may configure his telephone so that, when he enters alarm clock mode, he can leave that mode by either, both, or neither of these invocations. Alternatively, the telephone may be configured by the manufacturer to respond to either, both, or neither of these invocations, without the user having the ability to reconfigure the telephone.

INDUSTRIAL APPLICATION

Our invention is capable of exploitation in industry, and can be made and used, whenever is it desired to provide a wireless telephone with airplane and alarm clock modes. The individual components of the apparatus and method shown herein, taken separate and apart from one another, may be entirely conventional, it being their combination which we claim as our invention.

While we have described various modes of apparatus and method, the true spirit and scope of my invention are not limited thereto, but are limited only by the following claims and their equivalents, and we claim such as our invention.

What is claimed is:

1. A wireless communication device (WCD) comprising:
    a transceiver for transmitting and receiving signals;
    a modem for processing the transmitted and received signals;
    a processor for controlling the modem;
    a counter connected to the processor for providing a countdown signal;
    a power supply for supplying power to the WCD;
    a first switch connected to the power supply and selectively supplying power to the modem and the transceiver, the processor controlling the first switch to selectively supply power to the modem and the transceiver; and
    a second switch connected to the power supply and selectively supplying power to the processor based on the countdown signal, the counter controlling the second switch to selectively supply power to the processor.

2. The wireless communication device of claim 1, wherein the processor connects the power supply to the modem and the transceiver through the first switch based on an user input.

3. The wireless communication device of claim 2, wherein the processor continuously performs functions when the power supply is disconnected to the modem and the transceiver.

4. The wireless communication device of claim 1, wherein the second switch disconnects the power supply from the processor based on an user input.

5. The wireless communication device of claim 4, wherein the second switch connects the power supply to the processor based on another user input.

6. The wireless communication device of claim 1, wherein the processor sets the counter to generate the countdown signal based on an user input.

7. The wireless communication device of claim 6, wherein the second switch connects the power supply to the processor based on the countdown signal.

8. The wireless communication device of claim 7, wherein the processor updates a clock-calendar when connected to the power supply.

* * * * *

UNITED STATES PATENT AND TRADEMARK OFFICE
CERTIFICATE OF CORRECTION

PATENT NO. : 6,725,069 B2
DATED : April 20, 2004
INVENTOR(S) : Stephen A. Srigg and James A. Hutchison, IV It is certified that error appears in the above-identified patent and that said Letters Patent is hereby corrected as shown below:

Column 4,
Line 25, please replace existing Claim 2 with the following replacement Claim 2:
-- 2. The wireless communication device of claim 1, wherein the processor connects the power supply to the modem and the transceiver through the first switch based on a user input. --
Line 33, please replace existing Claim 4 with the following replacement Claim 4:
-- 4. The wireless communication device of claim 1, wherein the second switch disconnects the power supply from the processor based on a user input. --
Line 39, please replace existing Claim 6 with the following replacement Claim 6:
-- 6. The wireless communication device of claim 1, wherein the processor sets the counter to generate the countdown signal based on a user input. --

Signed and Sealed this

Second Day of August, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,725,069 B2 |
| DATED | : April 20, 2004 |
| INVENTOR(S) | : Stephen A. Sprigg and James A. Hutchison, IV |

Page 1 of 1

It is certified that error appears in the above-identified patent and that said Letters Patent is hereby corrected as shown below:

Column 4,
Lines 28, 35 and 41, delete "an" and replace with -- a -- for each occurrence.

Signed and Sealed this

Twenty-seventh Day of December, 2005

JON W. DUDAS
*Director of the United States Patent and Trademark Office*